(12) United States Patent
Saunders

(10) Patent No.: US 7,347,485 B1
(45) Date of Patent: Mar. 25, 2008

(54) EXTERIOR SURFACE MOUNTED ADJUSTABLE WIND DEFLECTOR

(76) Inventor: Charles A. Saunders, 8380 36th Ave., Columbus, NE (US) 68601

( * ) Notice: Subject to any disclaimer, the term of this patent is extended or adjusted under 35 U.S.C. 154(b) by 74 days.

(21) Appl. No.: 11/187,458

(22) Filed: Jul. 22, 2005

Related U.S. Application Data

(60) Provisional application No. 60/590,622, filed on Jul. 23, 2004.

(51) Int. Cl.
*B60J 1/20* (2006.01)
*B62J 17/04* (2006.01)

(52) U.S. Cl. .................... 296/180.5; 296/91; 296/96; 296/96.11; 296/78.1

(58) Field of Classification Search ............ 296/180.5, 296/78.1, 91, 96, 96.11, 217; *B60J 01/20, B60J 07/22; B62J 17/04*
See application file for complete search history.

(56) References Cited

U.S. PATENT DOCUMENTS

| | | | | |
|---|---|---|---|---|
| 2,062,483 | A * | 12/1936 | Thorp | 296/96.11 |
| 2,147,855 | A * | 2/1939 | Normandin | 454/134 |
| 4,033,245 | A * | 7/1977 | DeRees | 454/135 |
| 4,085,665 | A * | 4/1978 | Paxton | 454/135 |
| 4,166,650 | A * | 9/1979 | Saunders, IV | 296/78.1 |
| 4,256,339 | A * | 3/1981 | Ingram | 296/180.5 |
| 4,264,099 | A * | 4/1981 | Pierce | 296/18.2 |
| 4,379,584 | A * | 4/1983 | Willey | 296/78.1 |
| 4,615,556 | A * | 10/1986 | Stahel | 296/78.1 |
| 4,700,919 | A * | 10/1987 | Saunders, IV | 248/288.31 |
| 4,986,001 | A * | 1/1991 | Giamattei | 33/265 |
| 5,855,404 | A * | 1/1999 | Saunders | 296/78.1 |
| 6,789,835 | B2 * | 9/2004 | Wargin et al. | 296/78.1 |
| 7,032,915 | B2 * | 4/2006 | Bedard et al. | 280/288.4 |

* cited by examiner

*Primary Examiner*—Dennis H. Pedder
*Assistant Examiner*—Mike Hernandez
(74) *Attorney, Agent, or Firm*—Levenfeld Pearlstein, LLC; Marc E. Fineman; Mitchell J. Weinstein

(57) ABSTRACT

A wind deflector assembly attachable to the exterior, front or side surface of a vehicle windshield or body, adaptable to be connected to differently shaped and contoured windshields and bodywork, tunable to obtain the desired wind deflection effect and, in some embodiments, removable and reattachable to the vehicle windshield or other aerodynamically desirable locations on the vehicle body. The exterior surface mounted adjustable wind deflector of the present invention comprises a transparent, flexible shield along with two integrated mounting assemblies in the preferred embodiment. The mounting assemblies employ a clamshell type connector adapted for adhesive attachment to the exterior front surface of a windshield without having to drill or otherwise alter the windshield. In other embodiments, the mounting assemblies may utilize a simple non-clamshell adhesive connector, a hook-and-loop connector, a magnetic connector, or similar connection methods to attach the wind deflector to an aerodynamically desirable location on the vehicle windshield or body. The mounting assemblies each comprise a peripherally-toothed post that is integrated into of one the leaves of the clamshell connector. The post is threadedly mated to one end of a stem extending along the central longitudinal axis of the post. The other end of the stem is threadedly mated to a ball. A platform connector element carries as a part thereof a jaw-forming socket sized to receive the ball and squeeze it so as to maintain an adjusted position when the jaws of the socket are tightened down thereagainst. The platform connector element further includes means to attach the shield to the mounting assemblies using screws and adhesive tape.

22 Claims, 5 Drawing Sheets

EXTERIOR SURFACE MOUNTED ADJUSTABLE WIND DEFLECTOR

CROSS-REFERENCE TO RELATED APPLICATIONS

This application claims the benefit of U.S. Provisional Application No. 60/590,622, filed Jul. 23, 2004.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION (1) Field of the Invention

The present invention relates generally to wind deflectors of the type used on vehicles such as motorcycles, snowmobiles, all-terrain-vehicles (ATVs), watercraft, and other fast-moving, open-cockpit vehicles having a windshield. More specifically, the present invention is a wind deflector assembly attachable to the exterior, front, or side surface of a vehicle windshield or body, adaptable to be connected to differently shaped and contoured windshields and bodywork, tunable to obtain the desired wind deflection effect and, in some embodiments, removable and reattachable to the vehicle windshield or other aerodynamically desirable locations on the vehicle body.

(2) Description of the Prior Art

Windshields (or windscreens) of the type used on motorcycles, snowmobiles, all terrain vehicles (ATVs), watercraft, and other fast-moving, open-cockpit vehicles are, for the most part, fabricated from high-impact plastic materials which can be molded and contoured into complex streamlined shapes selected to offer minimal wind resistance while, at the same time, offering the driver protection from the wind, flying objects, and other potentially injurious occurrences. Unfortunately, airstream management is not a static problem that can be satisfactorily handled on a permanent basis by even a well-designed windshield. Instead, wind, driving conditions, speed, weather, temperature, and even terrain call for adjustments in the manner in which the wind is managed for optimal comfort and performance. For example, as simple a thing as deflecting cold air around the body, particularly the hands, in cold weather versus directing a stream of cool air over the body in the summer calls for movable extensions adjustably attached to the windshield.

Proper and efficient air management becomes vastly more complex when such things as turbulence, noise, efficiency and, most especially, vehicle control problems are considered. A rider must, for instance, be able to hear well if he or she is to operate a motorcycle safely on the highway or in traffic. If it becomes too noisy to hear properly due to turbulent air conditions existing behind a windshield caused by an improperly adjusted extension or deflector attached to the windshield, a decidedly unsafe operating condition has been created. Moreover, two-wheeled vehicles, such as motorcycles, are, by their very nature, less stable than vehicles having three or more wheels. This means, of course, that any crosswinds can be quite dangerous and of considerable concern. While such conditions are encountered much of the time the vehicle is being used, the adverse effects of these crosswinds can, to some extent at least, be counteracted and diminished by using a carefully adjusted wind deflector to set up an air current in opposition thereto. The thing to be avoided, obviously, is the use of such a deflector to set up wind currents that create control problems when none exists naturally.

Preshaped transparent wind deflectors are well known in the prior art. For example, U.S. Pat. No. 2,727,782 shows a rigid and transparent deflector for use on the hood of an automobile. U.S. Pat. No. 4,089,556 and U.S. Pat. No. 4,331,358 both reveal shaped winglets mounted upon the side margins of a fairing or windshield that roughly follow its contours, the prior being straight while the latter is curved. Nevertheless, any contouring necessary to match the shape of the windscreen upon which it is to be mounted is done during manufacturing at the factory and no provision is made for the user to do it himself or herself so as to accommodate different fairings or operating conditions. Italian Pat. 643,237 appears to include shapeable areas in the upper righthand and lefthand corners; however, the curtain material is clearly a thin transparent sheet which would be incapable of maintaining anything like a precise contour unless framed all the way around, certainly not if supported at spaced points along one edge.

Planar and unshapeable hinged winglets are old in the art, examples appearing in U.S. Pat. Nos. 4,309,056, 2,816,795, and 3,791,313, along with various foreign patents—Austrian Pat. 18,811, and three British Pats. 241,692, 248,533, and 208,888, for example. Even hinged winglets using ball-and-socket connections are old, examples being found in U.S. Pat. No. 2,062,483.

Also quite relevant in the prior art is applicant's own U.S. Pat. No. 4,700,919 which discloses a wind deflector winglet assembly that attaches to the trailing edge of a windshield. Despite its novel design, the prior art winglet device in applicant's U.S. Pat. No. 4,700,919 includes some limitations and drawbacks that are addressed by the present invention. For example, the prior art winglet devices use a cantilevered suspension, and the resulting force alignment creates torsion loading on the device mount. Thus, in the prior art device, the forces are managed by a mounting arm under deflection. This design causes more flex and less rigidity, resulting in more limited mass and wind loading capabilities. Though some compression loading does occur with the prior art winglet device (when the arms are positioned inwards to bow the wing), the greatest forces of wind and road shock remain torsion loading. The present invention, however, uses compression loading to control the wind load. Though the wind load vector varies with wind deflector angle, most loading channels through the mounts onto the vehicle surface are aligned as compression in the present invention. To illustrate, with the wind deflector of the present invention set to deflect air up over a rider, the wind forces press the deflector into its base with greater force as the wind speed increases. This results in a stronger, more stable mount than the prior art winglet device. This also permits the wind deflector of the present invention to be mounted, in alternative embodiments, using mounting techniques other than the clamshell-type folding clamp as used the prior art winglet, such as detachable hook-and-loop as well as magnetic mounts.

Another distinction between the prior art winglet device disclosed in U.S. Pat. No. 4,700,919 and the wind deflector of the present invention is the comparative placement range of each device. Both the prior art winglet device and the present invention preferably are mounted about two inches from the vehicle's windshield's trailing edge. This location is due to the presence of a web-linked failsafe clamshell-type cap that backs up the primary mount should its pressure sensitive adhesive fail. While this location is a true physical limit of the placement range of the prior art winglet device, it is not a true placement range limit of the present invention. The mount of the present device, without the failsafe cap which is included in the preferred embodiment, could easily be placed virtually anywhere on the vehicle's windshield or bodywork. If one tried to move the mounts of the prior art winglet system, the attachment arms would have to be made stronger and adjustable in reach. And, even if one did this there would be no aerodynamic advantage, since the prior art winglet is, for all practical purposes, purposely designed to be mounted close to or at the trailing edge of the windshield as extensions of the windshield's trailing edge. The wind deflector of the present invention is designed with no such placement limits.

Since the wind deflector of the present invention can be placed virtually anywhere on the vehicle windshield or bodywork, performance potential is endless. For example, if the wind deflector of the present invention is placed close to the trailing edge of the windshield, its function could be to deflect air smoothly over the rider or to pull air into the capsule for cooling. Since the smoothest deflection varies with the angle of attach, and many motorcycle windshields have adjustable angles, the best wind deflection angle varies not only from rider to rider and bike to bike, but also according to changes in any particular windshield's pitch or height. Additionally, if the wind deflector of the present invention is placed low, near an induction vent, it may be used to force more air into the vent for counter balancing the motorcycle capsule's interior. It also could be used in this location for stabilizing the airflow over the surface to maintain laminar flow. Mounted on a fairing's sides, the wind deflector of the present invention can push or pull hot or cold air away from or towards the rider. Mounted in front of the fairing's fork opening, the wind deflector can eliminate the disruptive thrust of air that shoots up through the fork openings. The prior art winglet's restriction to trailing edge mounting prevents its effective use in the above applications.

No one, to applicant's knowledge, has combined the features of a wind deflector which attaches to the exterior, front surface of a vehicle windshield, or any aerodynamically desirable location on the vehicle bodywork, and has the capability of being adjusted releasably locked in place by the user so as to establish and maintain a chosen contour fitting a given, but transient, set of driving conditions. Moreover, this can be accomplished without having to drill or otherwise mar the finish of the windshield or the bodywork. Such a wind deflector may be offered as a customized accessory for use with a particular windshield or, alternatively, as an addition to any of the several available windshield makes and models. Such a wind deflector may also utilize hook-and-loop, magnetic, or other similar removably detachable mounting means to permit its attachment to any aerodynamically desirable location on the vehicle windshield or body.

BRIEF SUMMARY OF THE INVENTION

The exterior surface mounted adjustable wind deflector of the present invention comprises a transparent, flexible shield (or "wing") along with two integrated mounting assemblies in the preferred embodiment. The mounting assemblies employ a clamshell type connector adapted for adhesive attachment to the exterior front surface of a windshield without having to drill or otherwise alter the windshield. In other embodiments, the mounting assemblies may utilize a simple non-clamshell adhesive connector, a hook-and-loop connector, a magnetic connector, or similar connection methods to attach the wind deflector to an aerodynamically desirable location on the vehicle windshield or body. The mounting assemblies each comprise a post that is integrated into of one the leaves of the clamshell connector. The post is threadedly mated to one end of a stem extending along the central longitudinal axis of the post. The other end of the stem is threadedly mated to a ball. A platform connector element carries as a part thereof a jaw-forming socket sized to receive the ball and squeeze it so as to maintain an adjusted position when the jaws of the socket are tightened down thereagainst. The platform connector element further includes means to attach the shield to the mounting assemblies using screws and adhesive tape. Several alternate embodiments are presented, including an embodiment in which the shield is opaque rather than transparent, for mounting in locations on the vehicle where a transparent shield is not necessary and where an opaque shield is aesthetically preferable.

It is, therefore, the principal object of the present invention to provide a novel and improved shapeable wind deflector for use with motorcycles, snowmobiles, all-terrain-vehicles, watercraft, and other fast-moving, open-cockpit vehicles having a windshield as a means for achieving precise management of the air flow.

Another objective of the present invention is to provide a wind deflector that can be mounted to the exterior, front surface of a vehicle windshield, adapted to be connected to differently shaped and contoured windshields, tuned to obtain the desired wind deflection effect.

Yet another objective of the present invention is to provide a wind deflector that can be removed and reattached to the vehicle windshield or other aerodynamically desirable locations on the vehicle body.

A further objective is the provision of an assembly of the character described which can be custom fitted but is essentially universal in its ability to be adapted to the many makes, models and sizes of windshields.

Another object of the within-described invention is that of providing mounting subassemblies having a unique construction that permits near universal adjustment thereof relative to a supporting surface without having to disassemble and reassemble any of its component parts.

Still another objective of the invention herein disclosed is the provision of two or more of the aforesaid mounting subassemblies which are capable of cooperating with one another and with a bendable transparent shield to which they are fastened in spaced relation to permit the user to contour the resulting wind deflector assembly so as to match the contour of the windshield from which it depends.

Further objects of the invention are to provide an air-control wind deflector that is versatile, lightweight, easy to mount and adjust, rugged, safe, relatively inexpensive and quite decorative in appearance.

It is another object of the present invention to provide a wind deflector where the stand-off distance between the wind deflector shield and the vehicle windshield is adjustable.

Another object of the present invention is to provide a wind deflector of the present invention is to provide a wind deflector that is mountable using a single mounting assembly.

Still another object of the present invention is to provide a wind deflector that may be mounted on various locations on the vehicle windshield to control the Venturi effect of air traveling between the vehicle windshield and the wind deflector.

An additional object of the present invention is to provide a wind deflector assembly in which the mounts experiences compression loading instead of torsion loading.

Yet another objective of the present invention is to provide a wind deflector that can be mounted using various mounting techniques, such as adhesive mounting, hook-and-loop mounting, and magnetic mounting.

A further objective of the present invention is to provide a wind deflector that may be mounted to any aerodynamically desirable location on the vehicle, including virtually any location on the exterior, front surface of the windshield any anywhere on the vehicle's bodywork.

Another object of the present invention is to provide a wind deflector in which the shield is opaque rather than transparent, for mounting in locations on the vehicle where a transparent shield is not necessary and where an opaque shield is aesthetically preferable.

The objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
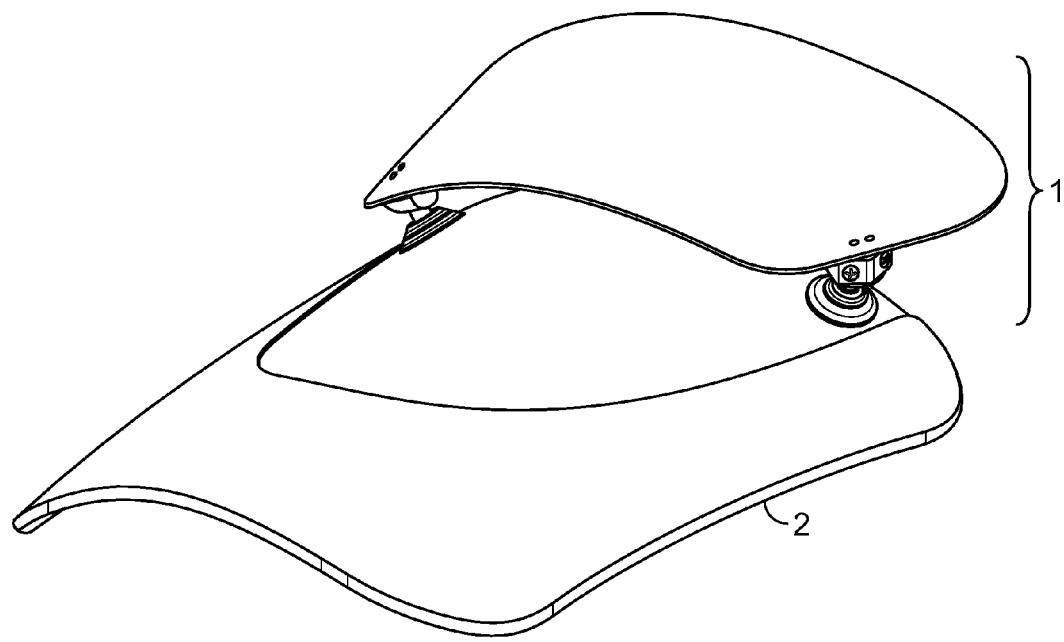
FIG. 1 is a perspective view of the exterior surface mounted adjustable wind deflector in the preferred embodiment of the present invention shown mounted to a motorcycle windshield and as positioned in a neutral tilt configuration.
Figure 2:
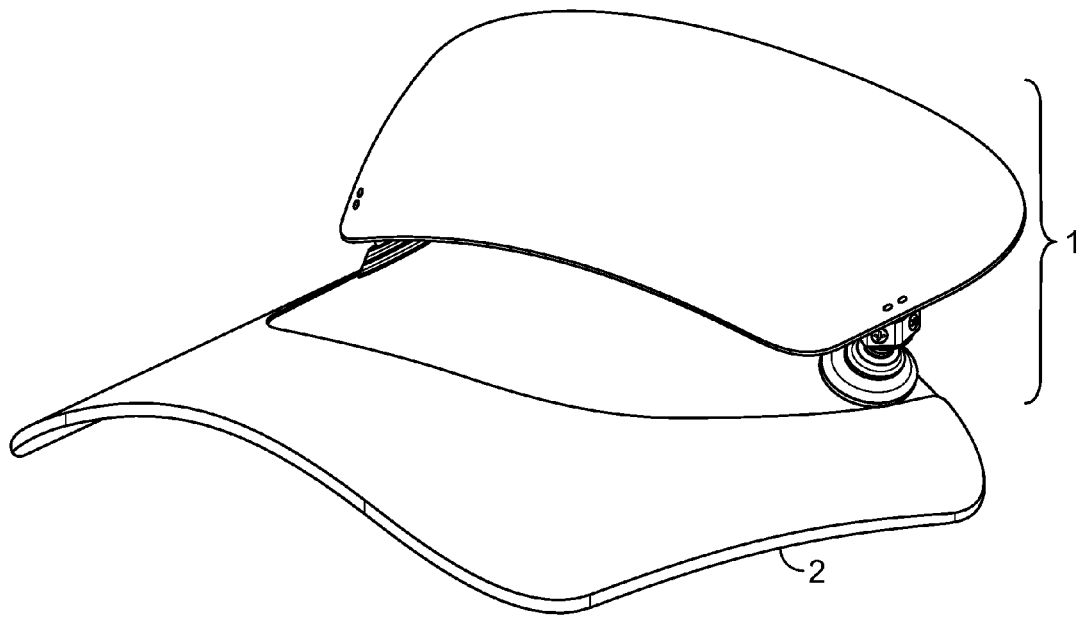
FIG. 2 is a perspective view of the exterior surface mounted adjustable wind deflector in the preferred embodiment of the present invention shown mounted to a motorcycle windshield and as positioned in a full forward tilt configuration.
Figure 3:
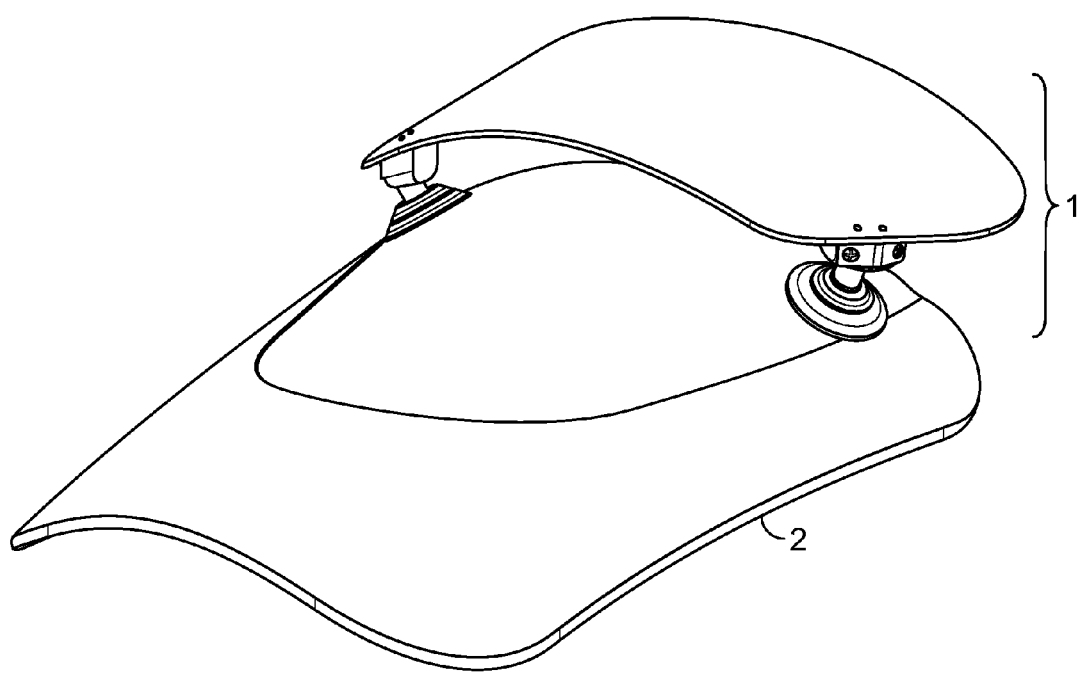
FIG. 3 is a perspective view of the exterior surface mounted adjustable wind deflector in the preferred embodiment of the present invention shown mounted to a motorcycle windshield and as positioned in a full rearward tilt configuration.

Referring now the drawings, in which similar or corresponding parts are identified with the same reference numeral, and more particularly to FIGS. 1, 2, and 3. FIG. 1 displays the exterior surface mounted adjustable wind deflector 1 in the preferred embodiment of the present invention as mounted on a motorcycle windshield 2 and as positioned in a neutral tilt configuration. A neutral tilt configuration directs some air upward along and above the top surface of the wind deflector 1 while permitting some air to travel above and long the top surface of the windshield 2. FIG. 2 depicts the exterior surface mounted adjustable wind deflector 1 as mounted on a motorcycle windshield 2 and as positioned in a full forward tilt configuration. A full forward tilt configuration directs a larger volume of air upward along and above the top surface of the wind deflector 1, creating a larger buffering zone behind the wind deflector 1 to protect taller drivers and, for example, preventing cold air from reaching the driver during cold weather. Lastly, FIG. 3 shows the exterior wind deflector 1 as mounted on a motorcycle windshield 2 and as positioned in a full rearward tilt configuration. Such a full rearward tit configuration permits a larger volume of air to travel above and along the top surface of the windshield 2, creating a smaller buffering zone behind the wind deflector 1 for shorter drivers and, for example, permitting cool air to reach the driver during warm weather.

Although FIGS. 1, 2, and 3 depict a motorcycle windshield, it will be appreciated that the windshield to which the exterior surface mounted adjustable wind deflector of the present invention attaches can be that of a snowmobiles, all-terrain-vehicle, watercraft, or other fast-moving, open-cockpit vehicle. Additionally, it will be appreciated that the exterior surface mounted adjustable wind deflector of the present invention can attach to other vehicle surfaces and/or bodywork as appropriate to achieve the desired deflection effect. Also, while FIGS. 1, 2, and 3 depict three particular tilt configurations of the wind deflector of the present invention, the wind deflector is infinitely adjustable to many intermediate tilt configurations as needed depending on the particular vehicle, driver, operating conditions, and desired effect.

Figure 4:
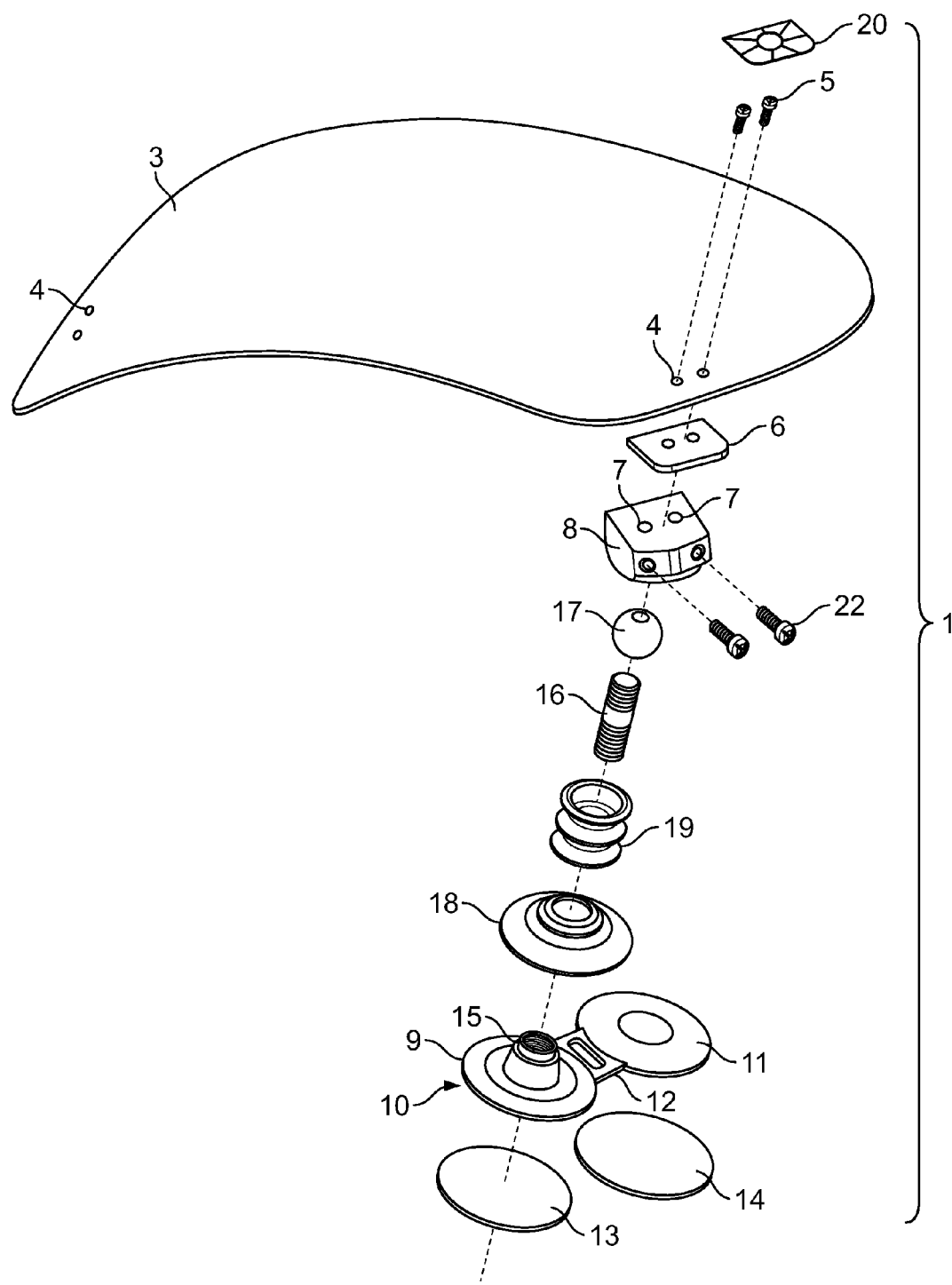
FIG. 4 is an exploded view of the exterior surface mounted adjustable wind deflector in the preferred embodiment of the present invention.
Figure 5:
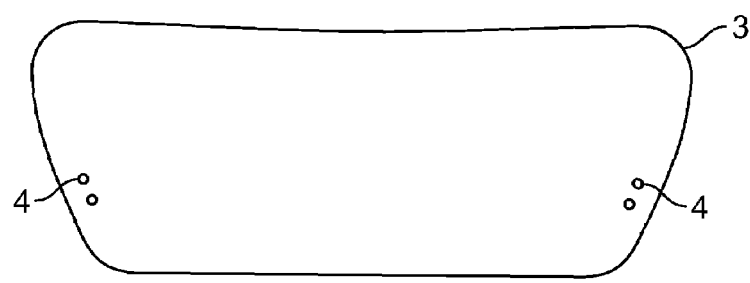
FIG. 5 is a flat view of the shield of the exterior surface mounted adjustable wind deflector in the preferred embodiment of the present invention.
Figure 6:
FIG. 6 is a curved view of the shield of the exterior surface mounted adjustable wind deflector in the preferred embodiment of the present invention.

FIG. 4 depicts an exploded view of the components of the exterior surface mounted adjustable wind deflector of the present invention. For ease of viewing, only one of two mounting assemblies is displayed, but it will be appreciated that the non-displayed mounting assembly is identical to the displayed mounting assembly. Wind deflector 1 is comprised in the preferred embodiment of a transparent, flexible shield (or "wing") 3, as shown in further detail in FIGS. 5 and 6. Shield 3 generally is trapezoidal in shape with rounded corners and is designed to create a sleek aesthetically pleasing appearance when mounted above a curved windshield. It should be noted that in alternate embodiments of the present invention shield 3 may be opaque rather than transparent, for mounting the wind deflector in locations on the vehicle where a transparent shield is not necessary and where an opaque shield is aesthetically preferable, such as when mounting the exterior surface mounted adjustable wind deflector on or near a vehicle's bodywork.

Shield 3 includes a plurality of bores 4 symmetrically positioned along the two non-parallel edges of shield 3.

Bores 4 are designed to accept screws 5 which pass through bores 4 and which are threadedly and matingly received by threaded bores 7 in the top surface of platform connector 8. A double-sided adhesive tape 6 (also including bores through which screws 5 may pass) is positioned between the top surface of platform connector 8 and shield 3 to complement and strengthen the connection of platform connector 8 and shield 3. A decorative sticker 20 is applied to the top surface of shield 3 to cover bores 4 and to prevent dirt, grime, and moisture from entering bores 4, traveling around screws 5, and potentially weakening the connection between shield 3 and platform connector 8.

In the preferred embodiment of the present invention, the mounting location of the platform connector 8 is fixed on shield 3 by the location of bores 4. However, other embodiments of the invention include multiple, adjustable mounting locations. For example, a plurality of multiple mounting holes or slotted holes may be integrated on shield 3, or magnetic or hook-and-loop strip fasteners may be integrated on the underside of shield 3. By providing this additional adjustability, the gap or distance between the vehicle windshield 2 and the lead edge of shield 3 can be controlled to fine tune the Venturi acceleration effect of air passing between the vehicle windshield 2 and the shield 3.

As further shown in FIG. 4, clamshell-type connector 10 comprises a pair of leaves 9 and 11 interconnected along adjacent edge portions by an integrally-formed hinge member 12. The connector shown is a molded plastic part preferably sufficiently flexible to conform to non-planar windshield 2 and/or vehicle body surfaces. The opposed inside surfaces of clamshell-type connector 10 are preferably both covered by pieces of adhesive tape 13 and 14 (shown separately from the connector 10 in FIG. 4 for ease of reference) of a type adapted to more or less permanently fasten the connector 10 to the exterior and interior surfaces of the windshield 2. Such adhesives are oftentimes of the non-drying type overlaid with a protective cover (not shown) that is stripped off and disposed of just prior to use. The use of adhesives negates having to drill the windscreen in order to mount the clamshell connectors 10 although, obviously, the use of a suitable fastener passed through the windshield and both leaves of the clamshell provides an alternative mounting method. Additional alternative mounting means include non-clamshell connectors using adhesive tape, hook-and-loop fasteners, and magnetic fasteners, which permit the wind deflector to be securely, and sometimes removably, attached to the windshield 2 or to the vehicle body in numerous aerodynamically desirable locations.

Leaf 9 of clamshell connector 10 carries and integrally-formed post 15 as further seen in FIG. 4. Post 15 is hollow and internally-threaded, designed to accept and mate with an externally threaded end of a stem 16 extending along the central longitudinal axis of post 15. For aesthetic appeal and to protect post 15 and stem 16 from the elements, a base cap 18 and an accordion-pleated boot 19 are positioned coaxially around post 15 and stem 16, respectively. The other end of stem 16 is designed to threadedly mate with a bore extending along the central longitudinal axis of a ball 17. In one embodiment of the wind deflector of the present invention, the length of stem 16 may vary (either by a telescopic-style stem (not shown), or by providing stems of varying lengths, as shown in FIG. 9). As seen in FIG. 9, stem 16a is shorter than stem 16 shown in FIG. 8. By adjusting the length of stem 16, the stand-off distance between the wind deflector shield 3 and windshield 2 can be changed. This tuning potential can be important because aerodynamic performance varies with the pressure boundaries between the underside of the wind deflector shield 3 and the exterior, front surface of the windshield 2 it resides above.

Figure 8:
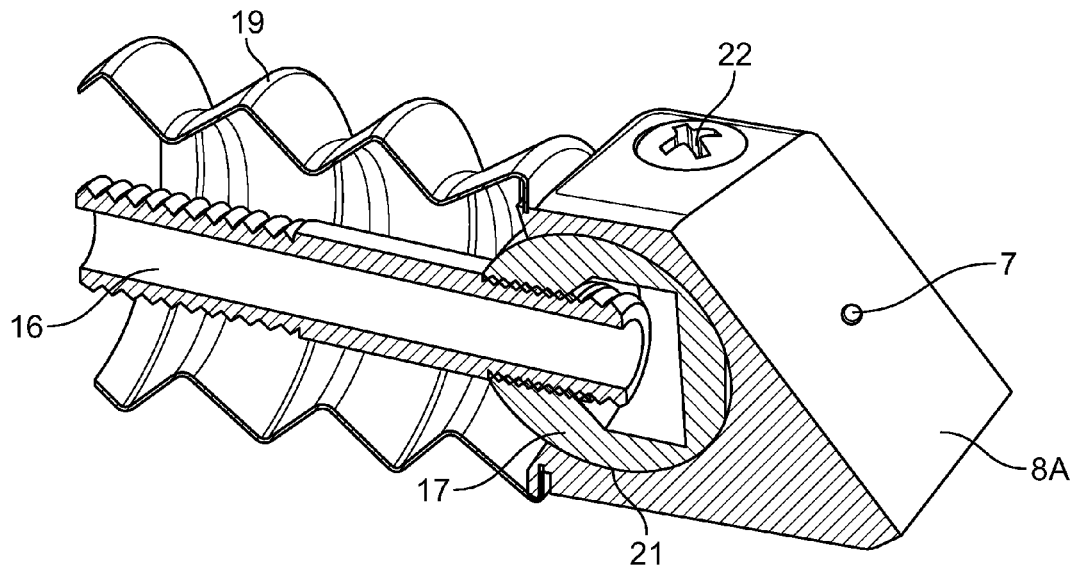
FIG. 8 is an enlarged, cross-sectional view of the stem, ball, and platform connector interface of the mounting assembly in the exterior surface mounted adjustable wind deflector in the preferred embodiment of the present invention.
Figure 9:
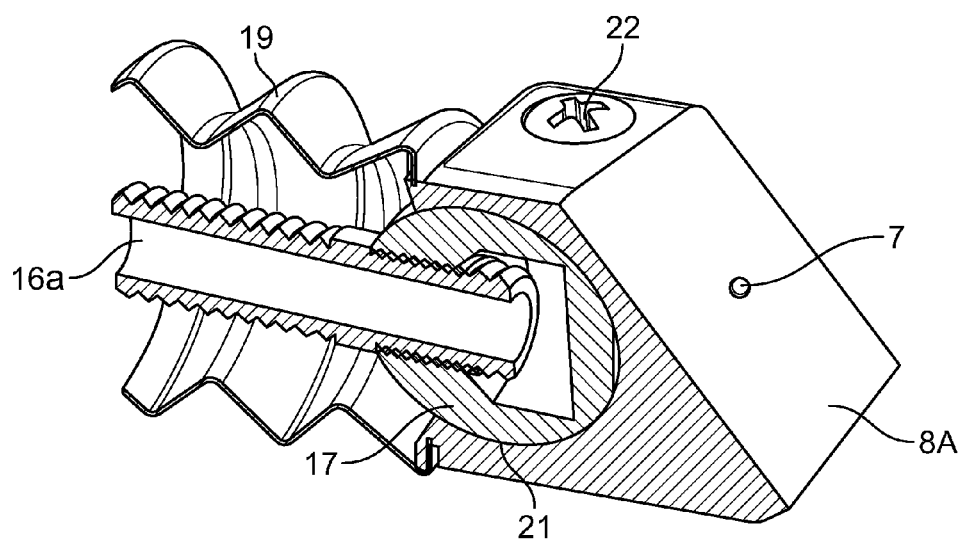
FIG. 9 is an enlarged, cross-sectional view of the stem, ball, and platform connector interface of the mounting assembly in the exterior surface mounted adjustable wind deflector in an alternate embodiment of the present invention, showing a stem with an alternate length (as compared to FIG. 8) configured to change the stand-off distance between the wind deflector shield and the windshield.

As further shown in FIG. 8, platform connector 8 is comprised of two pieces (8A, shown, and 8B, not shown) that form an integrated jaw-forming socket 21 designed and sized to receive ball 17 and squeeze it so as to maintain an adjusted position when the jaws of socket 21 are tightened down thereagainst using screws 22. Loosening of screws 22, of course, opens the jaws of the socket 21 and allows for limited universal movement of the ball 21 therein for purposes of tilting and otherwise adjusting the wind deflector 1 relative to its supporting structure.

Figure 7:
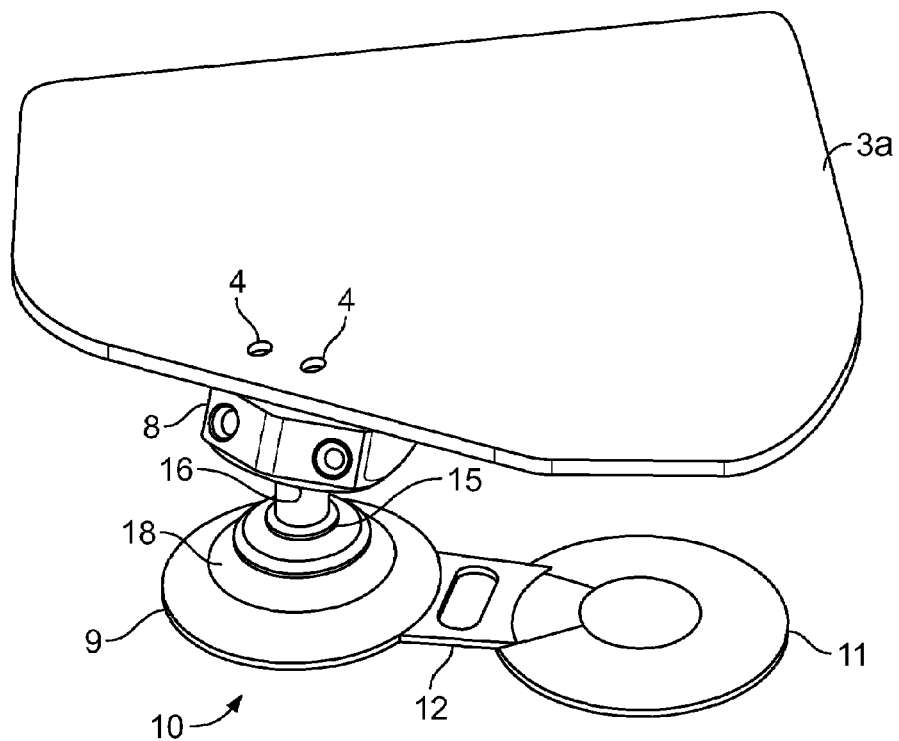
FIG. 7 is a perspective view of the single-mount embodiment of the exterior surface mounted adjustable wind deflector of the present invention.

Finally, FIG. 7 shows a single-mount embodiment of the exterior surface mounted adjustable wind deflector of the present invention (with some components removed for ease of view). In the single-mount embodiment, a reduced-sized flexible, transparent shield 3a replaces full-sized shield 3, with the remaining structural and fastening components of the wind deflector of the present invention (and their alternate embodiments, as discussed above) remaining the same. The single-mount embodiment may be mounted in locations on the vehicle where adequate physical space and mounting surfaces are unavailable for preferred dual-mount embodiment of the wind deflector. The single-mount embodiment of the wind deflector of the present invention also may be advantageous in situations where only partial airflow management is required.

While specific embodiments of the present invention have been shown and described, it is to be understood that numerous changes and modifications may be made therein without departing from the scope, spirit, and intent of the invention as set forth in the appended claims.

I claim:

1. An exterior surface mounted adjustable wind deflector comprising:
   a shield configured to be mounted to an exterior surface of a vehicle; and
   at least one connector configured to mount said shield to said exterior surface of said vehicle;
   wherein said at least one connector comprises a platform connector configured to attach to said shield, the platform connector comprising at least two pieces joined to form an integral jaw-forming socket, a ball disposed in said socket, a stem extending from said ball and a base member with a post configured to receive said stem in a generally parallel orientation with respect to a central longitudinal axis of said post and to attach said at least one connector to said exterior surface of said vehicle;
   wherein said ball is frictionally engaged by said socket and, wherein a position of said shield is adjustable relative to said exterior surface of said vehicle to achieve a desired aerodynamic effect.

2. The exterior surface mounted adjustable wind deflector of claim 1 wherein a contour of said shield is changeable to match a contour of said exterior surface of said vehicle.

3. The exterior surface mounted adjustable wind deflector of claim 1 wherein said shield is generally trapezoidal in shape.

4. The exterior surface mounted adjustable wind deflector of claim 1 wherein said shield is transparent.

5. The exterior surface mounted adjustable wind deflector of claim 1 wherein said shield is opaque.

6. The exterior surface mounted adjustable wind deflector of claim 1 wherein said base member comprises a clamshell-type connector configured to grip said exterior surface of said vehicle.

7. The exterior surface mounted adjustable wind deflector of claim 1 wherein said shield is pivotally mounted to said exterior surface of said vehicle.

8. The exterior surface mounted adjustable wind deflector of claim 1 wherein said at least one connector is adhesively mounted to said exterior surface of said vehicle.

9. The exterior surface mounted adjustable wind deflector of claim 1 wherein said at least one connector is removably mounted to said exterior surface of said vehicle.

10. The exterior surface mounted adjustable wind deflector of claim 1 wherein said at least one connector is further configured to adjust a stand-off distance between said shield and said exterior surface of said vehicle.

11. The exterior surface mounted adjustable wind deflector of claim 1 wherein said shield is further designed to be mounted to said at least one connector at a plurality of locations on said shield.

12. An exterior surface mounted adjustable wind deflector comprising:
    a shield configured to be mounted to a single exterior surface of a vehicle;
    at least one connector designed to mount said shield to said exterior surface of said vehicle; and
    a means to universally adjust a position of said shield relative to said exterior surface of said vehicle to achieve a desired aerodynamic effect;
    wherein said means to universally adjust a position of said shield relative to said exterior surface of said vehicle comprises a platform connector configured to attach to said shield the platform connector comprising at least two pieces joined to form an integral jaw-forming socket, a ball disposed in said socket, a stem extending from said ball and a base member with a post configured to receive said stem in a generally parallel orientation with respect to a central longitudinal axis of said post and to attach said at least one connector to said exterior surface of said vehicle, wherein said ball is frictionally engaged by said socket.

13. The exterior surface mounted adjustable wind deflector of claim 12 wherein said shield further comprises a means to adapt to a contour of said exterior surface of said vehicle.

14. The exterior surface mounted adjustable wind deflector of claim 12 wherein said shield further comprises a means to mount said shield to said at least one connector at a plurality of locations on said shield.

15. The exterior surface mounted adjustable wind deflector of claim 12 wherein said means to universally adjust said shield relative to said exterior surface of said vehicle further comprises a least one screw configured to control movement of the ball in said socket.

16. The exterior surface mounted adjustable wind deflector of claim 12 wherein said at least one connector further comprises a means to adhesively mount said connector to said exterior surface of said vehicle.

17. The exterior surface mounted adjustable wind deflector of claim 12 wherein said at least one connector further comprises a means to removably mount said connector to said exterior surface of said vehicle.

18. The exterior surface mounted adjustable wind deflector of claim 12 wherein said at least one connector further comprises a means to adjust a stand-off distance between said shield and said exterior surface of said vehicle.

19. An exterior surface mounted adjustable wind deflector comprising:
    a shield;
    a first connector configured to mount a first portion of said shield to a first exterior surface of a vehicle; and,
    a second connector configured to mount a second portion of said shield to a second exterior surface of said vehicle;
    wherein said first connector further comprises a first platform connector mounted to said first end of said shield, and said second connector further comprises a second platform connector mounted to said second end of said shield; and
    wherein said first platform comprises at least two pieces joined to form a first integral jaw-forming socket, a first ball disposed in said first socket, a first stem extending from said first ball and a first base member with a first post configured to receive said first stem in a generally parallel orientation with respect to a central longitudinal axis of said first post; and
    wherein said second platform connector comprises at least two pieces joined to form a second integral jaw-forming socket, a second ball disposed in said second socket a second stem extending from said second ball and a second base member with a second post configured to receive said second stem in a generally parallel orientation with respect to a central longitudinal axis of said second post;
    wherein said first base member comprises a first clamshell-type connector mounted to said first exterior surface of said vehicle, and said second base member comprises a second clamshell-type connector mounted to said second exterior surface of said vehicle; and
    wherein said first connector further comprises a first stem, and said second connector further comprises a second stem; and
    wherein said first ball is frictionally engaged by said first integral jaw-forming socket of said first platform connector, and said second ball is frictionally engaged by said second integral jaw-forming socket of said second platform connector; and
    wherein a position of said shield is adjustable relative to said first exterior surface of said vehicle and said second exterior surface of said vehicle to achieve a desired aerodynamic effect.

20. The exterior surface mounted adjustable wind deflector of claim 19 wherein said first platform connector is removably and adjustably mounted to said first end of said shield, and said second platform connector is removably and adjustably mounted to said second end of said shield.

21. The exterior surface mounted adjustable wind deflector of claim 19 wherein said first connector is removably and adjustably mounted to said first exterior surface of said vehicle, and said second connector is removably and adjustably mounted to said second exterior surface of said vehicle.

22. The exterior surface mounted adjustable wind deflector of claim 1 wherein said shield is rotatably mounted to said first connector and said second connector.

* * * * *

UNITED STATES PATENT AND TRADEMARK OFFICE
CERTIFICATE OF CORRECTION

PATENT NO.       : 7,347,485 B1
APPLICATION NO.  : 11/187458
DATED            : March 25, 2008
INVENTOR(S)      : Charles A. Saunders Page 1 of 1

It is certified that error appears in the above-identified patent and that said Letters Patent is hereby corrected as shown below:

Col. 9 Claim 12, line 13 should read:
 -- said shield, the platform connector comprising at least --

Signed and Sealed this

Seventh Day of October, 2008

JON W. DUDAS
*Director of the United States Patent and Trademark Office*